United States Patent
Faerber (10) Patent No.: US 9,572,047 B2
(45) Date of Patent: Feb. 14, 2017

(54) ADJACENT CHANNEL LEAKAGE REDUCTION IN SCALABLE WIRELESS COMMUNICATION NETWORK

(71) Applicant: Intel Corporation, Santa Clara, CA (US)

(72) Inventor: Michael Faerber, Wolfratshausen (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/142,594

(22) Filed: Dec. 27, 2013

(65) Prior Publication Data
US 2015/0189518 A1   Jul. 2, 2015

(51) Int. Cl.
| | |
|---|---|
| H04W 24/02 | (2009.01) |
| H04W 52/14 | (2009.01) |
| H04W 52/34 | (2009.01) |
| H04W 52/36 | (2009.01) |
| H04W 72/04 | (2009.01) |
| H04L 1/00 | (2006.01) |
| H04W 52/24 | (2009.01) |

(52) U.S. Cl.
CPC ........... *H04W 24/02* (2013.01); *H04L 1/00* (2013.01); *H04W 52/367* (2013.01); *H04W 72/0406* (2013.01); *H04W 72/0473* (2013.01); *H04W 52/146* (2013.01); *H04W 52/243* (2013.01); *H04W 52/346* (2013.01); *H04W 72/042* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2002/0145988 | A1* | 10/2002 | Dahlman et al. | 455/447 |
| 2008/0019309 | A1* | 1/2008 | Kwun | H04W 16/02 370/329 |
| 2008/0070586 | A1* | 3/2008 | Kermoal | H04W 16/04 455/452.2 |
| 2009/0202010 | A1* | 8/2009 | Fu et al. | 375/260 |
| 2011/0206026 | A1* | 8/2011 | Kishiyama | H04L 5/0005 370/338 |
| 2012/0250750 | A1 | 10/2012 | Mishra et al. | |
| 2013/0021990 | A1* | 1/2013 | Roessel | H04W 72/0453 370/329 |

(Continued)

OTHER PUBLICATIONS

International Search Report and Written Opinion mailed Jan. 20, 2015 from International Application No. PCT/US2014/063888.

(Continued)

*Primary Examiner* — Lester Kincaid
*Assistant Examiner* — Daniel G Bassett
(74) *Attorney, Agent, or Firm* — Schwabe, Williamson & Wyatt, P.C.

(57) ABSTRACT

Embodiments of the present disclosure describe adjacent channel leakage reduction in wireless networks. An apparatus may include circuitry to receive, by a user equipment (UE) of a wireless communication network over downlink signaling, information to indicate a frequency offset of one or more uplink carrier bands of the UE and circuitry to shift a frequency of the one or more uplink carrier bands based on the frequency offset. Other embodiments may be described and/or claimed.

12 Claims, 8 Drawing Sheets

(56) References Cited

U.S. PATENT DOCUMENTS

| | | | | |
|---|---|---|---|---|
| 2013/0044621 | A1* | 2/2013 | Jung | H04W 52/243 370/329 |
| 2013/0148560 | A1* | 6/2013 | Yang | H04W 72/0473 370/311 |
| 2013/0176952 | A1 | 7/2013 | Shin et al. | |
| 2013/0182663 | A1* | 7/2013 | Ji et al. | 370/329 |
| 2013/0202069 | A1 | 8/2013 | Nilsson et al. | |
| 2014/0094165 | A1* | 4/2014 | Karlsson | H04W 16/14 455/423 |
| 2014/0307681 | A1* | 10/2014 | Feuersaenger | H04W 72/0473 370/329 |
| 2014/0362748 | A1* | 12/2014 | Barany et al. | 370/281 |
| 2015/0351122 | A1* | 12/2015 | Kim | H04W 52/146 370/329 |

OTHER PUBLICATIONS

Qualcomm Incorporated, "Modelling of Adjacent Carrier Interference," 3GPP TSG RAN WG1 Meeting #72bis R1-131588, Agenda item: 6.5.1, Apr. 15-19, 2013, Chicago, USA, 6 pages.

3GPP, "3rd Generation Partnership Project;Technical Specification Group Radio Access Network; User Equipment (UE) radio transmission and reception (FDD)" (Release 11), 3GPP TS 25.101 V11.4.0 (Dec. 2012), Valbonne, France, 333 pages.

3GPP, "3rd Generation Partnership Project; Technical Specification Group Radio Access Network; UE Radio Access capabilities" (Release 11), 3GPP TS 25.306 V11.4.0 (Dec. 2012), Valbonne, France, 68 pages.

3GPP, "Scalable UMTS Deployment Scenarios," 3GPP TSG RAN WG1 Meeting #72 R1-130347 St. Julian's, Malta, Jan. 28-Feb. 1, 2013, 6 pages.

3GPP, "Initial Considerations on Scalable UMTS," 3GPP TSG RAN WG1 Meeting #72 R1-130627 St Julian's, Malta, Jan. 28-Feb. 1, 2013, 6 pages.

3GPP, "Introducing Fractional UMTS to Enable Scalable Bandwidth Usage for UMTS FDD," 3GPP TSG RAN WG1 Meeting #72 R1-130650 St Julian's, Malta, Jan. 28-Feb. 1, 2013, 3 pages.

QUALCOMM, "What is Next for HSPA+?," 1000X, hspa+ enhancements, WCDMA+, Scalable UMTS, May 2013, 29 pages.

* cited by examiner

ADJACENT CHANNEL LEAKAGE REDUCTION IN SCALABLE WIRELESS COMMUNICATION NETWORK

FIELD

Embodiments of the present disclosure generally relate to the field of wireless communication systems, and more particularly, to adjacent channel leakage reduction in wireless networks.

BACKGROUND

Mobile networks that facilitate transfer of information at broadband rates continue to be developed and deployed. Such networks may be colloquially referred to herein as broadband wireless access (BWA) networks. A variety of different device types may be used in broadband wireless technologies. Such devices may include, for example, personal computers, smartphone, laptops, netbooks, ultrabooks, tablets, handheld devices, and other consumer electronics such as music players, digital cameras, etc., that are configured to communicate over the wireless broadband networks.

A wide range of possible deployments of scalable features are being considered for BWA networks such as, for example, Universal Mobile Telecommunications System (UMTS) and/or High Speed Packet Access (HSPA) networks. Scalable UMTS, for example, may be intended for various re-farming cases where 5 MHz allocations may leave a fraction of unused band. Operators may group carriers within their own bands closer to make use of the unused band, which may result in some inter-carrier interference. At edges of the carrier spectrum, adjacent to other operators, adjacent channel interference may be excessive for user equipment (UE) close to a "foreign" cell. Other example deployments may include the use of scalable UMTS in larger allocations to optimize the use of the spectrum. For example, three nominal carriers and one scalable carrier may be squeezed into 15 MHz. Operators may implement closer grouping of adjacent carrier bands to optimize use of allocated spectrum and to provide guard bands of the spectrum to avoid interference with other operators and systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe adjacent channel leakage reduction in wireless networks. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry," "module," or "logic" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Example embodiments may be described herein in relation to broadband wireless access (BWA) networks including networks operating in conformance with one or more protocols specified by the 3rd Generation Partnership Project (3GPP) and its derivatives, the WiMAX Forum, the Institute for Electrical and Electronic Engineers (IEEE) 802.16 standards (e.g., IEEE 802.16-2005 Amendment), long-term evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks (e.g., 3G, 4G, 5G and so forth) and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, enhanced node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Figure 1:
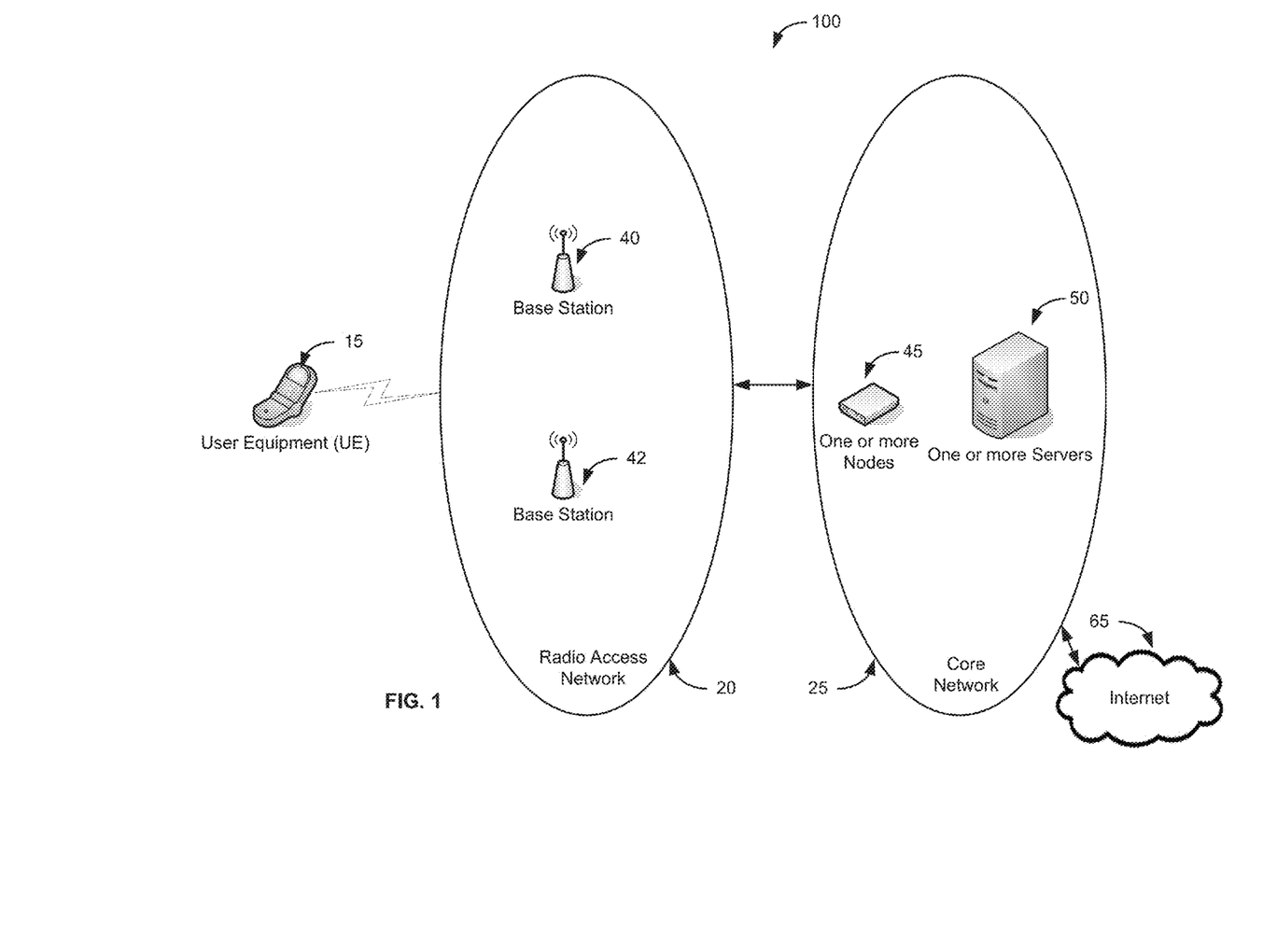
FIG. 1 schematically illustrates an example broadband wireless access (BWA) network in accordance with some embodiments.

FIG. 1 schematically illustrates an example broadband wireless access (BWA) network 100 in accordance with some embodiments. The BWA network 100 may include one or more radio access networks (hereinafter "RAN 20") and a core network 25. The BWA network 100 may be referred to as a "wireless communication network" herein. In some embodiments, the BWA network 100 may be a scalable network.

User Equipment (UE) 15 may access the core network 25 via a radio link ("link") with a base station (BS) such as, for example, one of base stations 40, 42, etc., in the RAN 20. The UE 15 may, for example, be a client device (e.g., subscriber station) that is configured to communicate with the base stations 40, 42 in conformance with one or more protocols. In some embodiments, the UE 15 may include circuitry configured to perform techniques to reduce adjacent channel leakage according to techniques described herein. The following description is provided for an example BWA network 100 that conforms with 3GPP for ease of discussion; however, subject matter of the present disclosure is not limited in this regard and the described embodiments may apply to other wireless communication networks (e.g., cellular networks) that benefit from the principles described herein. In one embodiment, the BWA network 100 may represent a cellular network configured to operate in conformance with a 3GPP protocol or standard.

In some embodiments, the base stations 40, 42 may include one or more Node Bs (also commonly denoted as evolved Node Bs, enhanced Node Bs, eNode Bs, or eNBs in 3GPP LTE), hereinafter "eNB station," and a UE 15 that is configured to communicate with the BWA network 100 via the base stations 40, 42. In some embodiments, the UE 15 may be configured to communicate using a multiple-input and multiple-output (MIMO) communication scheme. The base stations 40, 42 may include one or more antennas, one or more radio modules to modulate and/or demodulate signals transmitted or received on an air interface, and one or more digital modules to process signals transmitted and received on the air interface. One or more antennas of the UE 15 may be used to concurrently utilize radio resources of multiple respective component carriers (e.g., which may correspond with antennas of base stations 40, 42) of the BWA network 100. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a cellular phone, in various embodiments the UE 15 may be a personal computer (PC), a notebook, ultrabook, netbook, smart phone, an ultra mobile PC (UMPC), a handheld mobile device, an universal integrated circuit card (UICC), a sensor, a personal digital assistant (PDA), a Customer Premise Equipment (CPE), a tablet, or other consumer electronics such as MP3 players, digital cameras, and the like.

In some embodiments, communication with the UE 15 via RAN 20 may be facilitated via one or more nodes 45. The one or more nodes 45 may serve as an interface between the core network 25 and the RAN 20. According to various embodiments, the one or more nodes 45 may include a Mobile Management Entity (MME) that is configured to manage signaling exchanges (e.g., authentication of the UE 15) between the base stations 40, 42 and the core network 25 (e.g., one or more servers 50), a Packet Data Network Gateway (PGW) to provide a gateway router to the Internet 65, and/or a Serving Gateway (SGW) to manage user data tunnels or paths between the base stations 40, 42 of the RAN 20 and the PGW. Other types of nodes may be used in other embodiments.

The core network 25 may include logic to provide authentication of the UE 15, device configuration, or other actions associated with establishment of a communication link to provide a connected state of the UE 15 with the BWA network 100. For example, the core network 25 may include one or more servers 50 that may be communicatively coupled to the base stations 40, 42. In an embodiment, the one or more servers 50 may include a Home Subscriber Server (HSS), which may be used to manage user parameters such as a user's International Mobile Subscriber Identity (IMSI), authentication information, and the like. The one or more servers 50 may include logic that is configured to perform actions described in connection with a network device herein. The core network 25 may include other servers, interfaces, and modules. The one or more servers 50 may include over-the-air (OTA) servers in some embodiments. In some embodiments, logic associated with different functionalities of the one or more servers 50 may be combined to reduce a number of servers, including, for example, being combined in a single machine or module.

According to various embodiments, the BWA network 100 is an Internet Protocol (IP) based network. For example, the core network 25 may be an IP based network. Interfaces between network nodes (e.g., the one or more nodes 45) may be based on IP, including a backhaul connection to the base stations 40, 42. In some embodiments, the BWA network 100 includes a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. In some embodiments, the RAN 20 may include GSM EDGE Radio Access Network (GERAN) where EDGE stands for Enhanced Data for GSM Evolution, Universal Terrestrial Radio Access Network (UTRAN), or Evolved UTRAN (E-UTRAN). The BWA network 100 may operate in accordance with other network technologies in other embodiments.

In an embodiment where the RAN 20 is a UTRAN, the base stations 40, 42 may represent eNB stations and/or Radio Network Controllers (RNCs), which are configured to communicate with the UE 15. In an embodiment where the RAN 20 is a GERAN, the base stations 40, 42 may represent a base station controller (BSC) configured to communicate with the UE 15 (e.g., a mobile station) via a base transmission station (BTS). A downlink (DL) transmission may be a communication from the base station (e.g., base station 40 or 42) to the UE 15 (e.g., MTC device), and an uplink (UL) transmission may be a communication from the UE 15 to the base station (e.g., base station 40 or 42).

Figure 2:
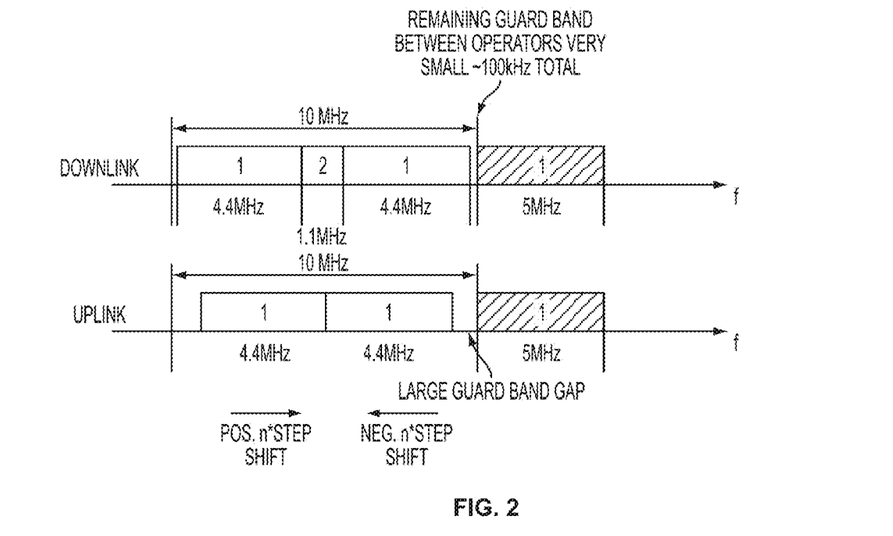
FIG. 2 schematically illustrates an example carrier band scheme with shifting of multiple uplink carrier bands, in accordance with some embodiments.

FIG. 2 schematically illustrates an example carrier band scheme with shifting of multiple uplink carrier bands, in accordance with some embodiments. The depicted scheme shows an asymmetric setup, which may allow adjustment of two nominal uplink carriers in addition to any raster shift made to create sufficient guardbands between carriers for different operators, as can be seen. The depicted scheme includes example downlink and uplink carrier bands for a UE, as can be seen. According to various embodiments, adjacent channel leakage may be reduced by shifting a frequency (f) of one or more uplink carrier bands (or allocations) relative to an uplink frequency band (or allocation). For example, a UE may be configured to receive information such as, for example, an information element over downlink signaling to identify use of stand-alone scalable carriers, scalable carriers in combination nominal carriers or the combination of scalable carriers. If scalable carriers are used by a UE, a transmitter-receiver separation may be defined or used. For example, uplink carrier allocation may be different (e.g., not identical) from downlink carrier allocation to provide sufficient guard band for uplink carrier(s). In some embodiments, the UE may be configured to receive information (e.g., an additional information element) over downlink signaling (e.g., system information broadcast message) to indicate an offset of one or more uplink carrier bands of the UE. In this manner, the uplink carrier(s) may receive the frequency offset information.

In some embodiments, the offset may be defined as n*step and an indication such as, for example, a most significant bit, to define the n*step for a positive or negative offset. For example, n may represent an integer and "step" may represent a step size of a frequency offset. Whereas the step is not identical to a raster such as, for example, a UARFCN raster (where UARFCN represents UTRA Absolute Radio Frequency Channel Number, where UTRA stands for UMTS Terrestrial Radio Access), finer tuning of the uplink carrier allocation is allowed. In particular, the frequency offset (e.g., step) may have a finer granularity than a raster of the uplink carrier band(s), which may allow more precise control for setting of the uplink carrier allocation in relation to a center of the uplink frequency allocation and allow optimization of a grouping of uplink carriers on a finer granularity. Using the frequency offset to adjust the uplink carrier allocation(s) may reduce effects of inter-carrier interference better than with a coarser raster.

In some embodiments, a minimum step of the n*step may be larger than a maximum worst case Doppler shift that a UE may experience. For example, if more extreme parameter like an operating frequency of 3.5 GHz and a UE speed of 500 km/h, a Doppler shift can be up to about 1500 Hz. Defining a step size to be bigger than at least 10 kHz may allow a receiver to distinguish between a Doppler shift and a frequency adjustment.

Figure 3:
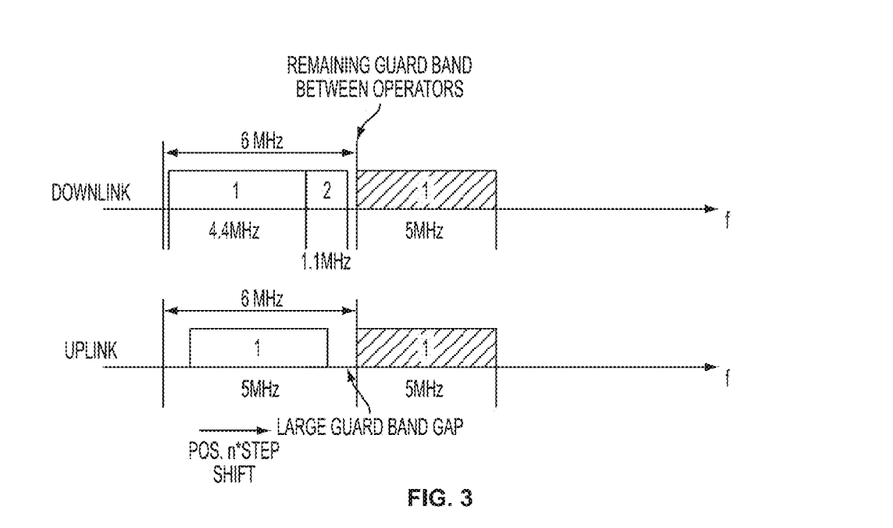
FIG. 3 schematically illustrates another example carrier band scheme with shifting of an uplink carrier band, in accordance with some embodiments.

FIG. 3 schematically illustrates another example carrier band scheme with shifting of an uplink carrier band, in accordance with some embodiments. The depicted scheme shows an asymmetric implementation where a single uplink carrier is shifted to create guard bands to the adjacent bands to reduce interference. According to various embodiments, adjacent channel leakage may be reduced by shifting a frequency (f) of the uplink carrier band according to techniques described in connection with FIG. 2. In some embodiments, the shift of frequency may remain below a range of a full variable Duplex shift. In embodiments where a single local oscillator is used by a UE for transmit and receive, relatively small offsets may be created on a transmit baseband (BB) level of the UE, which in turn with mixing with local oscillator signal may result in a desired offset.

Figure 4:
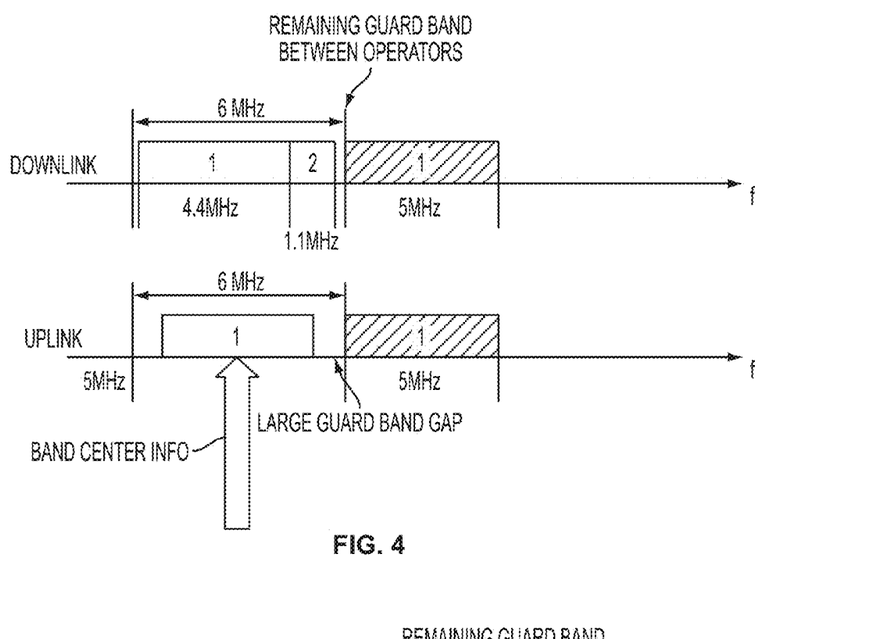
FIG. 4 schematically illustrates an example carrier band scheme with shifting of an uplink carrier band to a center of an uplink frequency allocation, in accordance with some embodiments.

FIG. 4 schematically illustrates an example carrier band scheme with shifting of an uplink carrier band to a center of an uplink frequency allocation, in accordance with some embodiments. The techniques described in connection with FIGS. 2 and 3 may be further modified for uplink carrier allocations in scalable scenarios. For example, in some embodiments, the network (e.g., a network device of the wireless communication network) may provide center information of an allocated uplink band. A scalable-enabled UE may interpret the information about center frequency and adjust/optimize the allocated uplink band accordingly. In some embodiments, the frequency offset received by the UE from the network over downlink signaling may include a center frequency (e.g., band center info) of an uplink frequency allocation for one or more uplink carriers. The UE may include circuitry configured to shift the one or more uplink carrier bands to be centered at the center frequency. For an asymmetric single carrier uplink scheme as depicted in FIG. 4, the UE may shift a center of the uplink carrier band to a center of the uplink frequency allocation, as can be seen.

Figure 5:
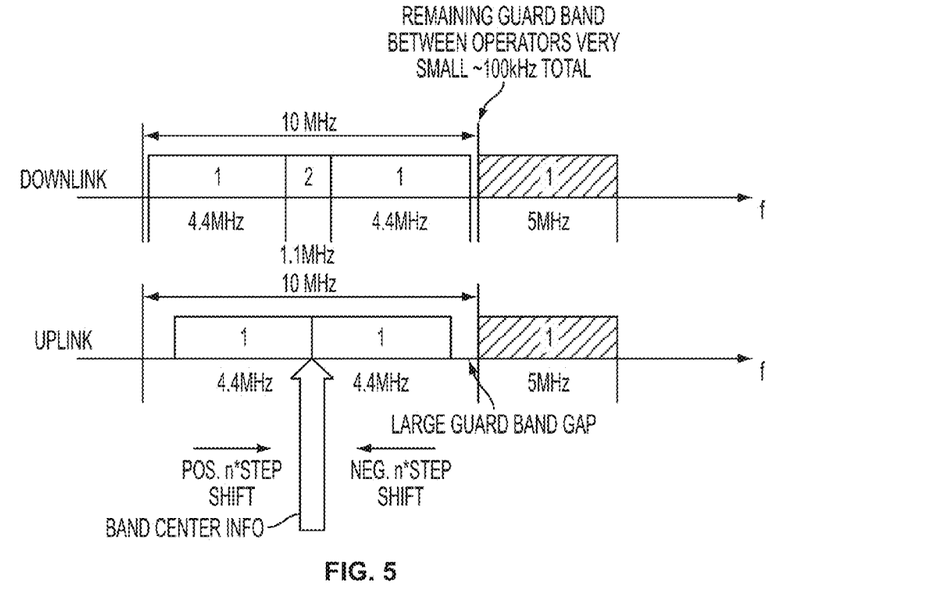
FIG. 5 schematically illustrates another example carrier band scheme with shifting of multiple uplink carrier bands to a center of an uplink frequency allocation, in accordance with some embodiments.

FIG. 5 schematically illustrates another example carrier band scheme with shifting of multiple uplink carrier bands to a center of an uplink frequency allocation, in accordance with some embodiments. In some embodiments, the carrier band scheme of FIG. 5 may comport with embodiments described in connection with FIG. 4. In some embodiments, the UE may be configured to calculate a shift for the multiple carriers to provide a shift of the multiple carriers to be at a center frequency of the uplink carrier allocation. For example, for a dual carrier uplink scenario as depicted in FIG. 5, the UE may calculate a shift for both uplink carriers to center both uplink carriers, as can be seen.

Figure 6:
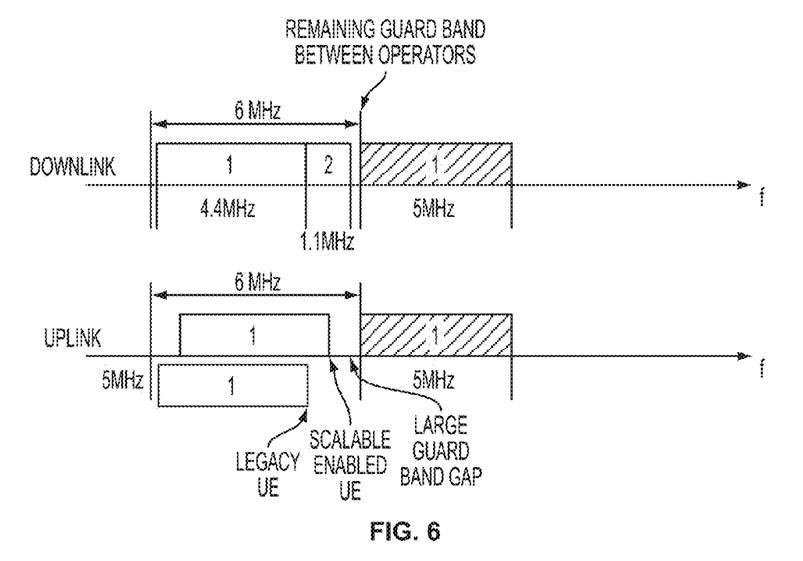
FIG. 6 schematically illustrates an example carrier band scheme showing uplink carrier bands for a scalable-enabled user equipment (UE) and non-scalable-enabled UE, in accordance with some embodiments.

FIG. 6 schematically illustrates an example carrier band scheme showing uplink carrier bands for a scalable-enabled user equipment (UE) and non-scalable-enabled UE, in accordance with some embodiments. In some embodiments, the network may be configured to determine whether the UE is a scalable-enabled UE or not (e.g., a legacy UE). For example, upon detecting that a UE is not a scalable-enabled UE, the network may be configured to send information to the UE to indicate a maximum transmission power reduction of one or more of the uplink carriers based on a determination by the network that the UE is not a scalable-enabled UE. Such determination and power reduction may be performed alternatively or in addition to the techniques described in connection with FIGS. 2-5, in some embodiments.

In some cases, a legacy UE that does not support scalable features such as, for example, scalable UMTS enhancements, may not be aware of network operation as a combination of scalable and nominal carriers. Such legacy UE may not interpret signaling for scalable operation. In some embodiments, a legacy UE which connects to the network may send a Physical Random Access Channel (PRACH), which may start with sending of a preamble. A legacy UE may start sending the preamble with low transmission power and increase the transmission power stepwise until the reception is granted by a base station (e.g., eNB) of the network by means of an Acquisition Indicator Channel (AICH). Such legacy procedure may limit interference effect of the legacy UE in a scalable scenario during the PRACH procedure. However, a legacy UE may interpret a UARFCN and duplex distance in a conventional non-scalable way and allocate the UL carrier close to a band edge, which may affect interference to another operator band as can be seen in FIG. 6. A base station receiver for scalable implementations (e.g., scalable UMTS deployments) may deal with a single carrier and dual carrier uplink. For example, receiver bandwidth until baseband may not restrict a legacy carrier. In baseband processing, a frequency offset of the PRACH preamble may be clearly distinguished from a Doppler shift (e.g., as described in connection with FIG. 3), which may be used by the base station to identify a legacy UE. In some embodiments, the base station may inform other network components such as, for example, a Radio Resource Management/Radio Resource Control (RRM/RRC) module, that a legacy UE is operating the scalable deployment.

A base station receiver may be configured with two different expectation windows for a preamble reception based on a different interpretation of the uplink carrier allocation by R12 and legacy UE, in some embodiments. With establishment of a Dedicated Channel (DCH) or a Forward Access Channel (FACH), the network may signal a power reduction of the UE and may limit a transmission power (e.g., maximum allowed transmission power) of the UE to reduce spectral spillover into an adjacent operator band. A maximum user data rate of the UE may be reduced or limited because the UE may use higher spreading factors to compensate for the reduction of transmission power.

Figure 7:
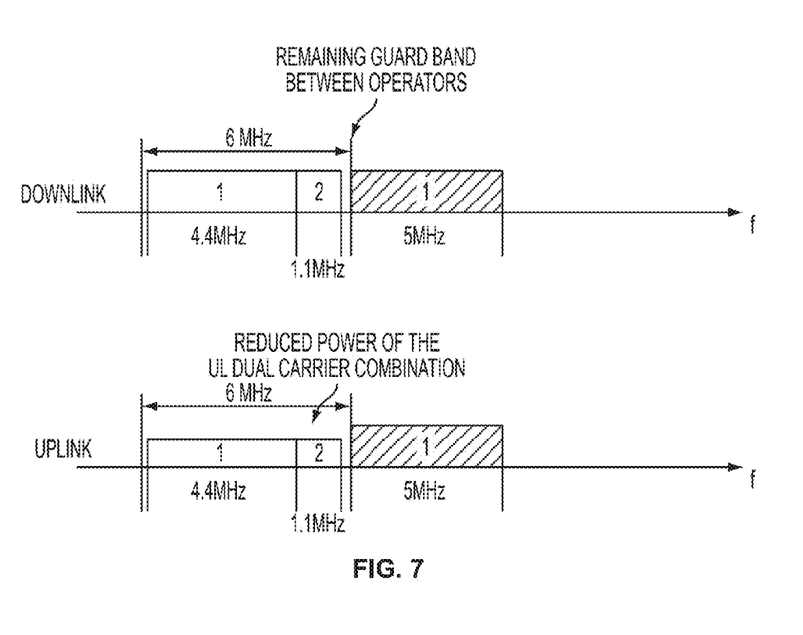
FIG. 7 schematically illustrates an example carrier band scheme showing transmission power reduction and mitigation for uplink carrier bands of a scalable-enabled UE, in accordance with some embodiments.

FIG. 7 schematically illustrates an example carrier band scheme showing transmission power reduction and mitigation for uplink carrier bands of a scalable-enabled UE, in accordance with some embodiments. In some embodiments, the UE may be a scalable-enabled UE having two or more uplink carriers and the UE may be configured with circuitry to receive information to indicate a transmission power reduction of one or more of the two or more uplink carriers. In some embodiments, the power reduction may be accomplished according to techniques described in connection with FIG. 6. The network and the UE may be configured to mitigate the transmission power reduction according to a variety of techniques including, for example, by scheduling of the uplink carriers to provide an effective increase in link level gain. Techniques of the present carrier band scheme may provide relaxed power reduction needs for a UE supporting scalable UMTS uplink carrier aggregation in some embodiments. In some embodiments, techniques described in connection with FIG. 7 may be suitable for a UE that includes a single local oscillator.

In some embodiments, a dual carrier scheme using a normal and a scalable carrier in the uplink may be used without aiming for capacity increase in the uplink. In embodiments, uplink user traffic capability may be similar as for a normal carrier where user data streams are split into two streams on both carriers and redundancy coding may be increased on both carriers as a result of less payload data. In some embodiments, each carrier may have an independent Hybrid Automatic Repeat Request (HARQ) process, increased scheduling flexibility and spreading over a wider band. The uplink user data stream may be split in a Media Access Control (MAC) layer ad mapped to the normal carrier and the scaled carrier. For example, in case of a 3, 84 Megachips per second (Mcps) carrier combined with a 0, 96 Mcps carrier, the payload allocated to a single carrier may be split to both carriers, which may result in a first increase of transmission bandwidth and spreading of the signals. Such spreading gain may result in ~1 dB gain in link level. Channel coding of the individual carriers may be changed for an improved redundancy coding in the rate matching process. Because each carrier has an independent HARQ process, scheduling of communication of information may be adapted to actual channel conditions of the carriers, which may provide up to an extra link gain of ~1 dB to provide a total link level gain of about ~1-2 dB. Such link level gain may mitigate or otherwise compensate the effects of power reduction, which in turn, may reduce a spectral power injected into adjacent bands. A corresponding interference reduction in the adjacent band systems may help restore system capacity. Similar principles may be applied to uplink carriers having other chiprates or link level gains.

In some embodiments, techniques for power reduction as described in connection with FIGS. 6 and 7 may increase an amplifier margin to a 1 dB compression point, which may result also in a spectral spread if the amplifier is operated in a more linear range. An operation mode of reduced power operation with or without uplink carrier aggregation may be signaled to a base station of the network to inform the base station and to ensure that uplink quality evaluation is based on a larger bandwidth in relation to the reduced maximum transmission power.

Figure 8:
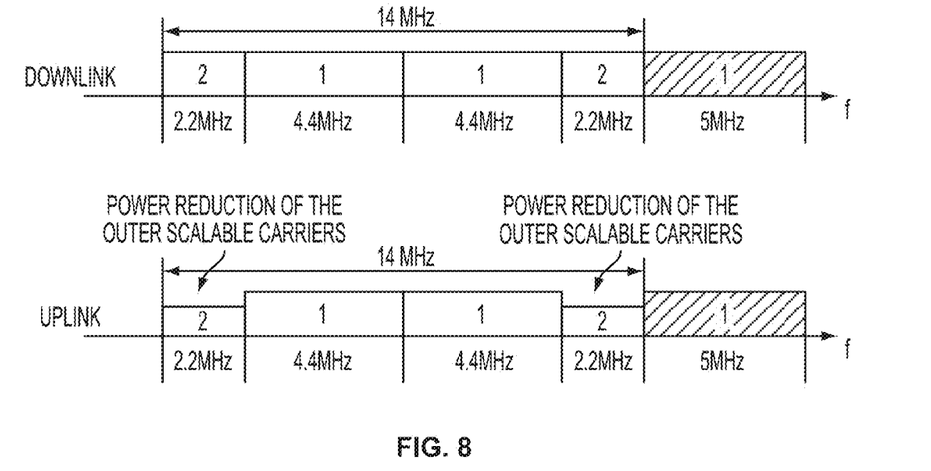
FIG. 8 schematically illustrates an example carrier band scheme showing transmission power reduction for outer scalable uplink carrier bands of a scalable-enabled UE, in accordance with some embodiments.

FIG. 8 schematically illustrates an example carrier band scheme showing transmission power reduction for outer scalable uplink carrier bands of a scalable-enabled UE, in accordance with some embodiments. In some embodiments, the UE may be a scalable-enabled UE having three or more uplink carriers. Two of the three or more uplink carriers may be scalable carriers at opposing outer edges of an uplink frequency allocation for the three or more uplink carriers, as can be seen. The UE may be configured to receive, over downlink signaling, information to indicate a maximum transmission power reduction that is configured to only reduce the maximum transmission power of the two scalable carriers at the opposing outer edges of the uplink frequency allocation, as can be seen. Techniques of FIG. 8 may provide a power profile setting in combined scalable/nominal uplink carrier allocations, according to various embodiments.

In some embodiments, scalable carriers may be allocated to band edges, as can be seen. Transmission power may be reduced for the uplink outer carriers to reduce an effect of power that may spill over in adjacent operator bands, which may be due to exploitation of the guard band. The RRM may schedule users with lower data rate services to the uplink outer carriers having reduced uplink transmission power where spreading compensate or mitigate for the reduced transmission power and/or the RRM may preferably schedule users with a link budge indicating closer proximity to the base station, to the outer carriers. Such users may have a relatively lower need to compensate path loss and may be able to better handle reduced transmission power setting. Higher rate users and users at the cell edge may be allocated to center carriers. In some embodiments, techniques of FIG. 8 may create concentric cells.

Figure 9:
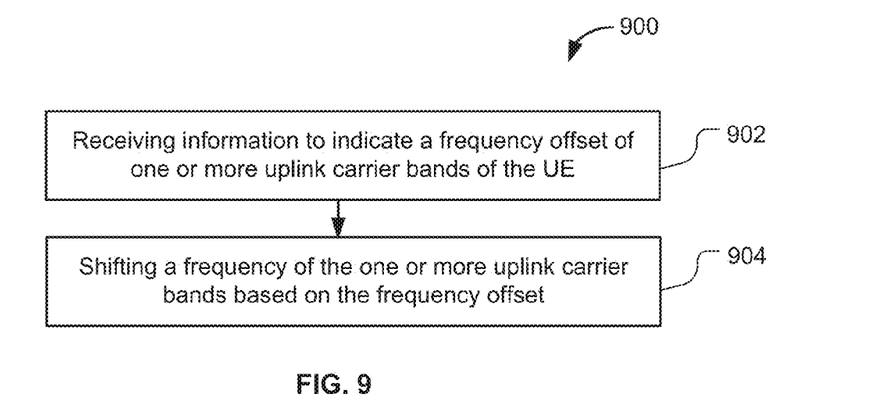
FIG. 9 is a flow diagram of a method for reducing adjacent channel leakage from a UE perspective, in accordance with some embodiments.

FIG. 9 is a flow diagram of a method 900 for reducing adjacent channel leakage from a UE perspective, in accordance with some embodiments. In some embodiments, the method 900 may comport with embodiments described in connection with FIGS. 2-5 and may be performed by any suitable circuitry of the UE.

At 902, the method 900 may include receiving information to indicate a frequency offset of one or more uplink carrier bands of the UE. The information may include, for example, n*step offset as described, for example, in connection with FIGS. 2 and 3 and/or a center frequency of an uplink frequency allocation for one or more uplink carriers corresponding with the one or more uplink carrier bands to facilitate auto-centering of the uplink carrier band(s) as described, for example, in connection with FIGS. 4 and 5. In some embodiments, the information may indicate that the offset is negative or positive. The offset may have a finer granularity than a raster of the one or more uplink carrier bands.

At 904, the method 900 may include shifting a frequency of the one or more uplink carrier bands based on the frequency offset. For example, the UE may be configured to shift according to information of the n*step offset or central band information of the uplink carrier band allocation.

Figure 10:
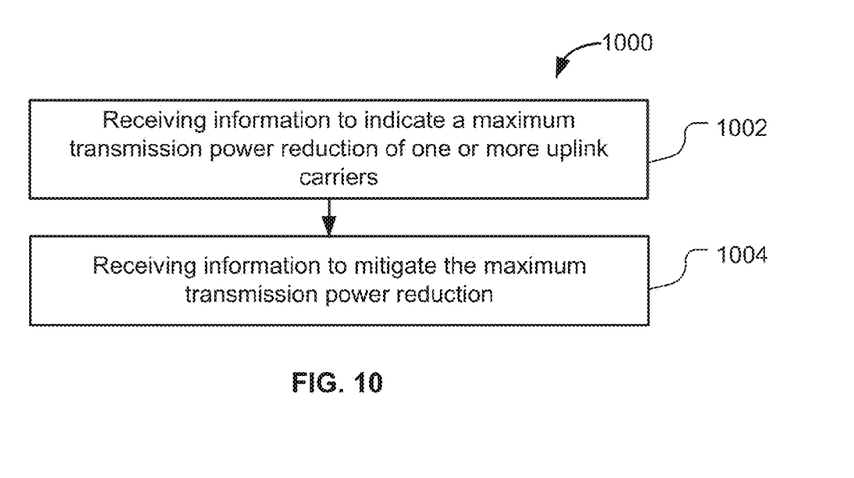
FIG. 10 is a flow diagram of another method for reducing adjacent channel from a UE perspective, in accordance with some embodiments.

FIG. 10 is a flow diagram of another method 1000 for reducing adjacent channel from a UE perspective, in accordance with some embodiments. In some embodiments, the method 1000 may comport with embodiments described in connection with FIGS. 6-8 and may be performed by any suitable circuitry of the UE.

At 1002, the method 1000 may include receiving information to indicate a maximum transmission power reduction of one or more uplink carriers. For example, in some embodiments, the UE may not be a scalable-enabled UE and the information may be sent by the network to the UE over downlink signaling based on a determination by a network device (e.g., eNB) of the wireless communication network that the UE is not a scalable-enabled UE.

In other embodiments, the UE may be a scalable-enabled UE having two or more uplink carriers (e.g., as determined by the network device). At 1004, the method 1000 may include receiving information to mitigate the maximum transmission power reduction. For example, the information may include scheduling information that is adapted to actual channel conditions of the carriers, which may each have an independent HARQ process to increase link level gain. Other techniques to mitigate the maximum transmission power reduction may be used. For example, the UE may receive information associated with splitting an uplink user data stream and mapping to a normal carrier and scaled carrier, which may result in an increase of transmission bandwidth and spreading of signals.

In some embodiments, the UE may have three or more uplink carriers and at least two of the three or more uplink carriers may be scalable carriers at opposing outer edges of an uplink frequency allocation for the three or more uplink carriers. The UE may be configured to receiving information that indicates the maximum transmission power reduction is configured to only reduce the maximum transmission power of the two scalable carriers at the opposing outer edges of the uplink frequency allocation.

Figure 11:
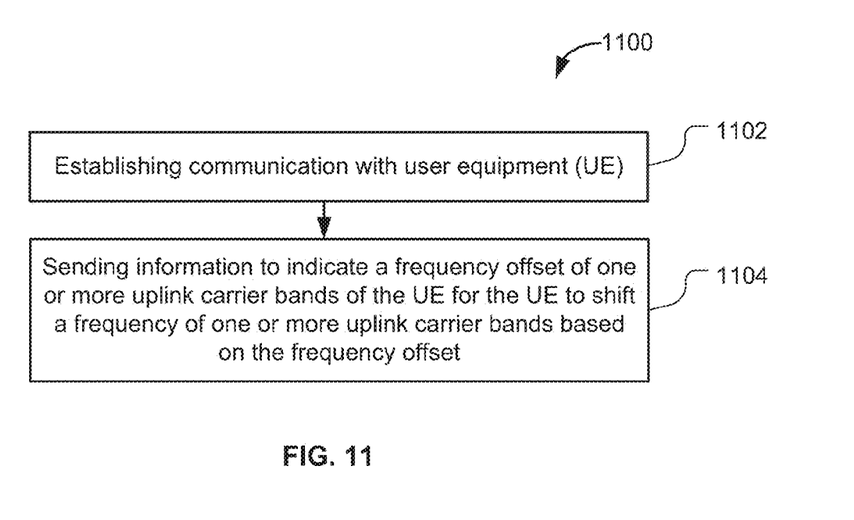
FIG. 11 is a flow diagram of a method for reducing adjacent channel leakage from a network perspective, in accordance with some embodiments.

FIG. 11 is a flow diagram of a method 1100 for reducing adjacent channel leakage from a network perspective, in accordance with some embodiments. In some embodiments, the method 1100 may comport with embodiments described in connection with FIGS. 2-5 and may be performed by any suitable circuitry of a wireless communication network (e.g., in an eNB). The method 1100 may correspond with method 900, but from the network perspective instead of the UE perspective.

At 1102, the method 1100 may include establishing communication with user equipment (UE). For example, one or more network devices of a core network may include logic/circuitry to provide authentication of the UE, device configuration, or other actions associated with establishment of a communication link to provide a connected state of the UE with the BWA network.

At 1104, the method 1100 may include sending information to indicate a frequency offset of one or more uplink carrier bands of the UE for the UE to shift a frequency of one or more uplink carrier bands based on the frequency offset. The information may comport with embodiments described in connection with 902 and 904 of method 900.

Figure 12:
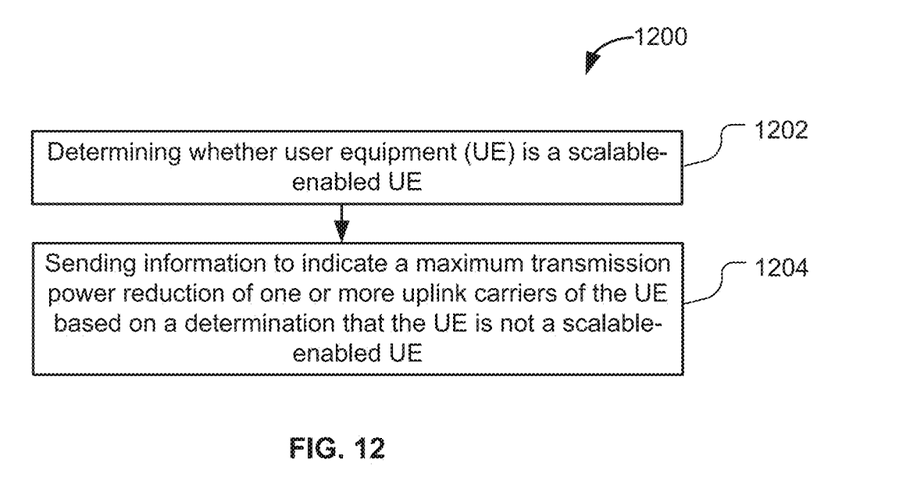
FIG. 12 is a flow diagram of another method for reducing adjacent channel leakage from a network perspective, in accordance with some embodiments.

FIG. 12 is a flow diagram of another method 1200 for reducing adjacent channel leakage from a network perspective, in accordance with some embodiments. In some embodiments, the method 1200 may comport with embodiments described in connection with FIG. 6 and may be performed by any suitable circuitry of a wireless communication network (e.g., in an eNB).

At 1202, the method 1200 may include determining whether user equipment (UE) is a scalable-enabled UE. For example, a network device (e.g., eNB) may be configured to determine whether the UE is scalable-enabled using techniques described in connection with FIG. 6 or any other suitable technique.

At 1204, the method 1200 may include sending information to indicate a maximum transmission power reduction of one or more uplink carriers of the UE based on a determination that the UE is not a scalable-enabled UE.

Figure 13:
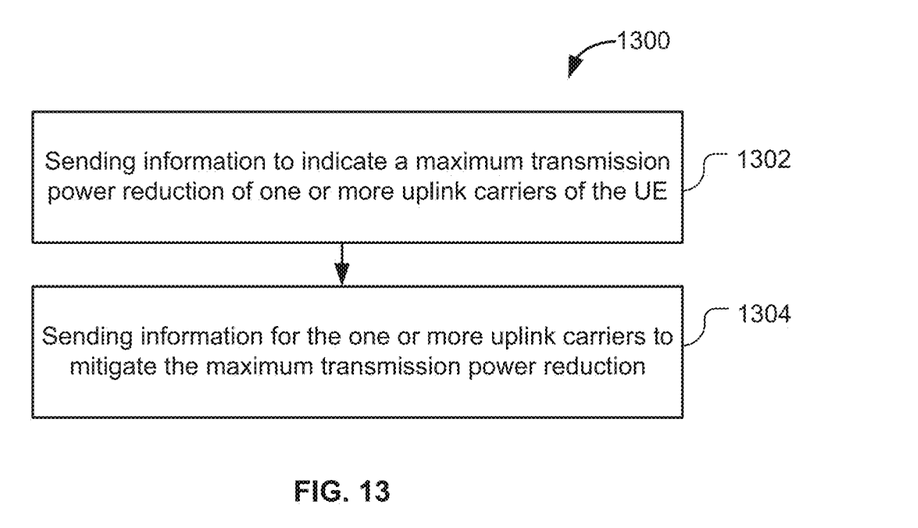
FIG. 13 is a flow diagram of yet another method for reducing adjacent channel leakage from a network perspective, in accordance with some embodiments.

FIG. 13 is a flow diagram of yet another method 1300 for reducing adjacent channel leakage from a network perspective, in accordance with some embodiments. In some embodiments, the method 1300 may comport with embodiments described in connection with FIGS. 7-8 and may be performed by any suitable circuitry of a wireless communication network (e.g., in an eNB). In some embodiments, the method 1300 may be performed for a scalable-enabled UE as determined by actions at 1202 of FIG. 12. The UE may have two or more uplink carriers in some embodiments.

At 1302, the method 1300 may include sending information to indicate a maximum transmission power reduction of one or more uplink carriers of the UE. In some embodiments. In some embodiments only one or more uplink carriers of two or more uplink carriers are affected by the maximum transmission power reduction. In some embodiments, the UE may have three or more uplink carriers and at least two of the three or more uplink carriers may be scalable carriers at opposing outer edges of an uplink frequency allocation for the three or more uplink carriers. The information, in such a case, may indicate that the maximum transmission power reduction is configured to only reduce the maximum transmission power of the two scalable carriers at the opposing outer edges of the uplink frequency allocation.

At 1304, the method 1300 may include sending information for the one or more uplink carriers to mitigate the maximum transmission power reduction. In some embodiments, the information to mitigate the power reduction may comport with embodiments described in connection with 1004 of method 1000.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 14:
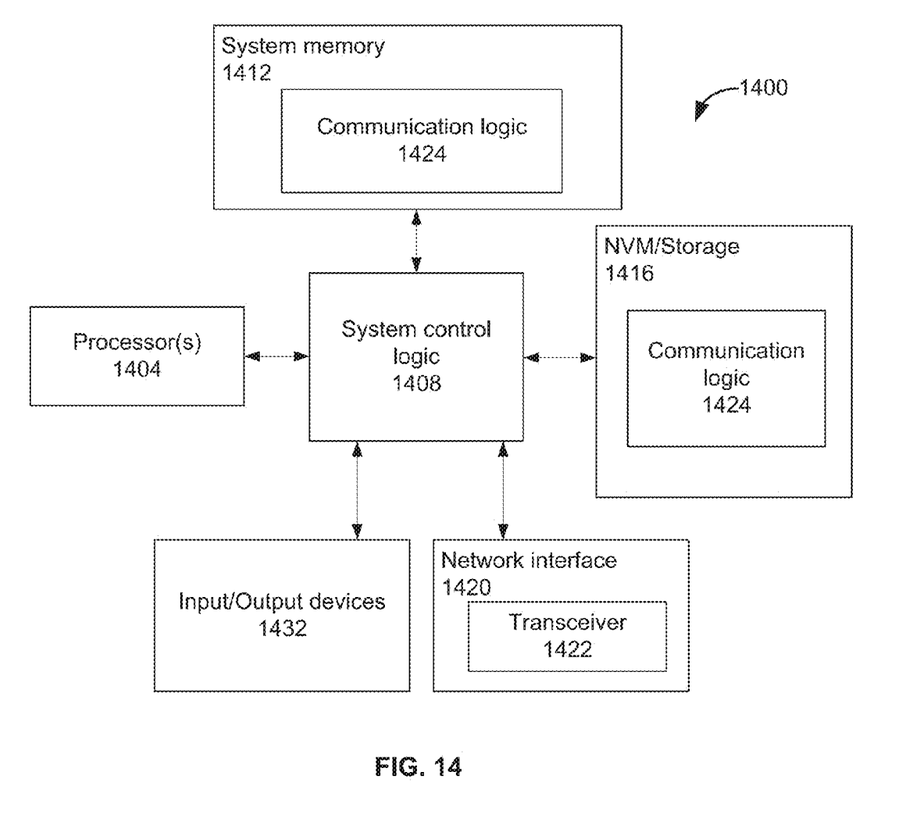
FIG. 14 schematically illustrates an example system that may be used to practice various embodiments described herein.

The techniques and configurations described herein may be implemented into a system using any suitable hardware and/or software to configure as desired. FIG. 14 schematically illustrates an example system 1400 (e.g., computing device) that may be used to practice various embodiments described herein. The example system 1400 may represent, for example, user equipment (e.g., UE 15 of FIG. 1) or a network device (e.g., any suitable network device/module of FIG. 1). FIG. 14 illustrates, for one embodiment, an example system 1400 comprising one or more processor(s) 1404, system control logic 1408 coupled with at least one of the processor(s) 1404, system memory 1412 coupled with system control logic 1408, non-volatile memory (NVM)/storage 1416 coupled with system control logic 1408, a network interface 1420 coupled with system control logic 1408, and input/output (I/O) devices 1432 coupled with system control logic 1408.

The processor(s) 1404 may include one or more single-core or multi-core processors. The processor(s) 1404 may include any combination of general-purpose processors and dedicated processors (e.g., graphics processors, application processors, baseband processors, etc.).

System control logic 1408 for one embodiment may include any suitable interface controllers to provide for any suitable interface to at least one of the processor(s) 1404 and/or to any suitable device or component in communication with system control logic 1408.

System control logic 1408 for one embodiment may include one or more memory controller(s) to provide an interface to system memory 1412. System memory 1412 may be used to load and store data and/or instructions, e.g., communication logic 1424. System memory 1412 for one embodiment may include any suitable volatile memory, such as suitable dynamic random access memory (DRAM), for example.

NVM/storage 1416 may include one or more tangible, non-transitory computer-readable or machine-readable storage or media used to store data and/or instructions, e.g., communication logic 1424. NVM/storage 1416 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1416 may include a storage resource physically part of a device on which the system 1400 is installed or it may be accessible by, but not necessarily a part of, the device. For example, the NVM/storage 1416 may be accessed over a network via the network interface 1420 and/or over Input/Output (I/O) devices 1432.

The communication logic 1424 may include instructions that, when executed by one or more of the processors 1404, cause the system 1400 to perform operations associated with methods 900, 1000, 1100, 1200, or 1300 as described with respect to the above embodiments. In various embodiments, the communication logic 1424 may include hardware, software, and/or firmware components that may or may not be explicitly shown in system 1400.

Network interface 1420 may have a transceiver 1422 to provide a radio interface for system 1400 to communicate over one or more network(s) and/or with any other suitable device. In various embodiments, the transceiver 1422 may be integrated with other components of system 1400. For example, the transceiver 1422 may include a processor of the processor(s) 1404, memory of the system memory 1412, and NVM/Storage of NVM/Storage 1416. Network interface 1420 may include any suitable hardware and/or firmware. Network interface 1420 may include a plurality of antennas to provide a multiple input, multiple output radio interface. Network interface 1420 for one embodiment may include, for example, a wired network adapter, a wireless network adapter, a telephone modem, and/or a wireless modem.

For one embodiment, at least one of the processor(s) 1404 may be packaged together with logic for one or more controller(s) of system control logic 1408. For one embodiment, at least one of the processor(s) 1404 may be packaged together with logic for one or more controllers of system control logic 1408 to form a System in Package (SiP). For one embodiment, at least one of the processor(s) 1404 may be integrated on the same die with logic for one or more controller(s) of system control logic 1408. For one embodiment, at least one of the processor(s) 1404 may be integrated on the same die with logic for one or more controller(s) of system control logic 1408 to form a System on Chip (SoC).

In various embodiments, the I/O devices 1432 may include user interfaces designed to enable user interaction with the system 1400, peripheral component interfaces designed to enable peripheral component interaction with the system 1400, and/or sensors designed to determine environmental conditions and/or location information related to the system 1400.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1420 to communicate with components of a positioning network, e.g., a global positioning system (GPS) satellite.

In various embodiments, the system 1400 may be a mobile computing device such as, but not limited to, a laptop computing device, a tablet computing device, a netbook, a smartphone, etc. In various embodiments, system 1400 may have more or less components, and/or different architectures.

EXAMPLES

According to various embodiments, the present disclosure describes an apparatus. Example 1 of an apparatus may include first circuitry to receive, by a user equipment (UE) of a wireless communication network over downlink signaling, information to indicate a frequency offset of one or more uplink carrier bands of the UE and second circuitry to shift a frequency of the one or more uplink carrier bands based on the frequency offset. Example 2 may include the apparatus of Example 1, wherein the information further indicates that the offset is negative or positive and the frequency offset has a finer granularity than a raster of the one or more uplink carrier bands. Example 3 may include the apparatus of any of Examples 1-2, wherein the frequency offset comprises a center frequency of an uplink frequency allocation for one or more uplink carriers of the UE, the UE is a scalable-enabled UE and the second circuitry is configured to shift the one or more uplink carrier bands to be centered at the center frequency. Example 4 may include the apparatus of Example 1, wherein the UE is not a scalable-enabled UE and the first circuitry to receive is further configured to receive information to indicate a maximum transmission power reduction of one or more of the uplink carriers based on a determination by the wireless communication network that the UE is not a scalable-enabled UE. Example 5 may include the apparatus of Example 1, wherein the UE is a scalable-enabled UE having two or more uplink carriers and the first circuitry to receive is further configured to receive information to indicate a maximum transmission power reduction of one or more of the two or more uplink carriers and scheduling information for the two or more uplink carriers to mitigate the maximum transmission power reduction. Example 6 may include the apparatus of Example 5, wherein the UE has three or more uplink carriers, two of the three or more uplink carriers are scalable carriers at opposing outer edges of an uplink frequency allocation for the three or more uplink carriers and the information to indicate the maximum transmission power reduction is configured to only reduce the maximum transmission power of the two scalable carriers at the opposing outer edges of the uplink frequency allocation.

According to various embodiments, the present disclosure describes a method. Example 7 of a method may include receiving, by user equipment (UE) of a wireless communication network over downlink signaling, information to indicate a frequency offset of one or more uplink carrier bands of the UE and shifting a frequency of the one or more uplink carrier bands based on the frequency offset. Example 8 may include the method of Example 7, wherein the information further indicates that the offset is negative or positive and the frequency offset has a finer granularity than a raster of the one or more uplink carrier bands. Example 9 may include the method of any of Examples 7-8, wherein the frequency offset comprises a center frequency of an uplink frequency allocation for one or more uplink carriers, the UE is a scalable-enabled UE and shifting the frequency comprises shifting the one or more uplink carrier bands to be centered at the center frequency. Example 10 may include the method of Example 7, wherein the UE is not a scalable-enabled UE, the method further comprising receiving information to indicate a maximum transmission power reduction of one or more of the uplink carriers based on a determination by the wireless communication network that the UE is not a scalable-enabled UE. Example 11 may include the method of Example 7, wherein the UE is a scalable-enabled UE having two or more uplink carriers, the method further comprising receiving information to indicate a maximum transmission power reduction of one or more of the two or more uplink carriers and receiving scheduling information for the two or more uplink carriers to mitigate the maximum transmission power reduction. Example 12 may include the method of Example 11, wherein the UE has three or more uplink carriers, two of the three or more uplink carriers are scalable carriers at opposing outer edges of an uplink frequency allocation for the three or more uplink carriers and the information to indicate the maximum transmission power reduction is configured to only reduce the maximum transmission power of the two scalable carriers at the opposing outer edges of the uplink frequency allocation.

According to various embodiments, the present disclosure describes another apparatus. Example 13 of an apparatus may include first circuitry to establish, by an enhanced node B station (eNB) of a wireless communication network, communication with user equipment (UE) and second circuitry to send, by the eNB over downlink signaling, information to indicate a frequency offset of one or more uplink carrier bands of the UE for the UE to shift a frequency of the one or more uplink carrier bands based on the frequency offset. Example 14 may include the apparatus of Example 13, wherein the information further indicates that the offset is negative or positive and the frequency offset has a finer granularity than a raster of the one or more uplink carrier bands. Example 15 may include the apparatus of any of Examples 13-14, wherein the frequency offset comprises a center frequency of an uplink frequency allocation for one or more uplink carriers and the UE is a scalable-enabled UE. Example 16 may include the apparatus of Example 13, wherein the UE is not a scalable-enabled UE, the apparatus further comprising third circuitry to determine whether the UE is not a scalable-enabled UE, wherein the circuitry to send is further configured to send information to indicate a maximum transmission power reduction of one or more of the uplink carriers based on a determination by the eNB that the UE is not a scalable-enabled UE. Example 17 may include the apparatus of Example 14, wherein the UE is a scalable-enabled UE having two or more uplink carriers and the second circuitry to send is further configured to send information to indicate a maximum transmission power reduction of one or more of the two or more uplink carriers and scheduling information for the two or more uplink carriers to mitigate the maximum transmission power reduction. Example 18 may include the apparatus of Example 17, wherein the UE has three or more uplink carriers, two of the three or more uplink carriers are scalable carriers at opposing outer edges of an uplink frequency allocation for the three or more uplink carriers and the information to indicate the maximum transmission power reduction is configured to only reduce the maximum transmission power of the two scalable carriers at the opposing outer edges of the uplink frequency allocation.

According to various embodiments, the present disclosure describes another method. Example 19 of a method may include establishing, by an enhanced node B station (eNB) of a wireless communication network, communication with user equipment (UE) and sending, by the eNB over downlink signaling, information to indicate a frequency offset of one or more uplink carrier bands of the UE for the UE to shift a frequency of the one or more uplink carrier bands based on the frequency offset. Example 20 may include the method of Example 19, wherein the frequency offset comprises a center frequency of an uplink frequency allocation for one or more uplink carriers of the UE and the UE is a scalable-enabled UE. Example 21 may include the method of any of Examples 19-20, wherein the UE is not a scalable-enabled UE, the method further comprising determining whether the UE is not a scalable-enabled UE and sending information to indicate a maximum transmission power reduction of one or more of the uplink carriers based on a determination by the eNB that the UE is not a scalable-enabled UE. Example 22 may include the method of Example 19, wherein the UE is a scalable-enabled UE having two or more uplink carriers, the method further comprising sending information to indicate a maximum transmission power reduction of one or more of the two or more uplink carriers and sending scheduling information for the two or more uplink carriers to mitigate the maximum transmission power reduction. Example 23 may include the method of Example 22, wherein the UE has three or more uplink carriers, two of the three or more uplink carriers are scalable carriers at opposing outer edges of an uplink frequency allocation for the three or more uplink carriers and the information to indicate the maximum transmission power reduction is configured to only reduce the maximum transmission power of the two scalable carriers at the opposing outer edges of the uplink frequency allocation. Example 24 may include the method of Example 19, wherein the wireless communication network comprises a cellular network configured to operate in accordance with a $3^{rd}$ Generation Partnership Project (3GPP) protocol.

Various embodiments may include any suitable combination of the above-described embodiments including alternative (or) embodiments of embodiments that are described in conjunctive form (and) above (e.g., the "and" may be "and/or"). Furthermore, some embodiments may include one or more methods or articles of manufacture (e.g., non-transitory computer-readable media) having instructions, stored thereon, that when executed result in actions of any of the above-described embodiments. Moreover, some embodiments may include apparatuses or systems having any suitable means for carrying out the various actions of the above-described embodiments.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
first circuitry to receive, by a scalable-enabled user equipment (UE) of a wireless communication network over downlink signaling, information to indicate a frequency offset of one or more uplink carrier bands of a first operator, wherein the frequency offset is to increase a guard band between at least one of the one or more uplink carrier bands and a carrier band of a second operator; and
second circuitry to shift a frequency of the one or more uplink carrier bands based on the frequency offset to increase the guard band between at least one of the one or more uplink carrier bands and the carrier band of a second operator,
wherein the UE has three or more uplink carriers and two of the three or more uplink carriers are scalable carriers at opposing outer edges of an uplink frequency allocation for the three or more uplink carriers, the first circuitry is further to receive information to indicate a maximum transmission power reduction of the two uplink carriers and scheduling information for the two uplink carriers to mitigate the maximum transmission power reduction, the information to indicate the maximum transmission power reduction is to reduce the maximum transmission power of the two uplink carriers only, and
the second circuitry is further to reduce the maximum transmission power of the two uplink carriers in accordance with the information to indicate the maximum transmission power reduction.

2. The apparatus of claim 1, wherein:
the information to indicate the frequency offset further indicates that the offset is negative or positive; and
the frequency offset has a finer granularity than a raster of the one or more uplink carrier bands.

3. The apparatus of claim 1, wherein:
the frequency offset comprises a center frequency of an uplink frequency allocation for one or more uplink carriers of the UE; and
the second circuitry is further to shift the one or more uplink carrier bands to be centered at the center frequency.

4. A method comprising:
receiving, by scalable-enabled user equipment (UE) of a wireless communication network over downlink signaling, information to indicate a frequency offset of one or more uplink carrier bands of a first operator, wherein the frequency offset is to increase a guard band between at least one of the one or more uplink carrier bands and a carrier band of a second operator, wherein the UE has three or more uplink carriers and two of the three or more uplink carriers are scalable carriers at opposing outer edges of an uplink frequency allocation for the three or more uplink carriers;
receiving information to indicate a maximum transmission power reduction of the two uplink carriers only;
receiving scheduling information for the two uplink carriers to mitigate the maximum transmission power reduction;
shifting a frequency of the one or more uplink carrier bands based on the frequency offset to increase the guard band between at least one of the one or more uplink carrier bands and the carrier band of a second operator; and
reducing the maximum transmission power of the two uplink carriers in accordance with the information to indicate the maximum transmission power reduction.

5. The method of claim 4, wherein:
the information to indicate the frequency offset further indicates that the offset is negative or positive; and
the frequency offset has a finer granularity than a raster of the one or more uplink carrier bands.

6. The method of claim 4, wherein:
the frequency offset comprises a center frequency of an uplink frequency allocation for one or more uplink carrier bands; and
shifting the frequency comprises shifting the one or more uplink carrier bands to be centered at the center frequency.

7. An apparatus comprising:
first circuitry to establish, by an enhanced node B station (eNB) of a wireless communication network, communication with scalable-enabled user equipment (UE) that has three or more uplink carriers in which two of the three or more uplink carriers are scalable carriers at opposing outer edges of an uplink frequency allocation for the three or more uplink carriers; and second circuitry to send, by the eNB over downlink signaling, information to indicate a frequency offset of one or more uplink carrier bands of a first operator for the UE to shift a frequency of the one or more uplink carrier bands based on the frequency offset, wherein the frequency offset is to increase a guard band between at least one of the one or more uplink carrier bands and a carrier band of a second operator, wherein the second circuitry is further to send information to indicate a maximum transmission power reduction of the two uplink carriers and scheduling information for the two uplink carriers to mitigate the maximum transmission power reduction, and the information to indicate the maximum transmission power reduction is to direct the UE to reduce the maximum transmission power of the two uplink carriers only.

8. The apparatus of claim 7, wherein:

the information further indicates that the offset is negative or positive; and the frequency offset has a finer granularity than a raster of the one or more uplink carrier bands.

9. The apparatus of claim 7, wherein:

the frequency offset comprises a center frequency of an uplink frequency allocation for one or more uplink carrier bands.

10. A method comprising:

establishing, by an enhanced node B station (eNB) of a wireless communication network, communication with a scalable-enabled user equipment (UE) that has three or more uplink carriers in which two of the three or more uplink carriers are scalable carriers at opposing outer edges of an uplink frequency allocation for the three or more uplink carriers; and sending, by the eNB over downlink signaling, information to indicate a frequency offset of one or more uplink carrier bands of a first operator for the UE to shift a frequency of the one or more uplink carrier bands based on the frequency offset, wherein the frequency offset is to increase a guard band between at least one of the one or more uplink carrier bands and a carrier band of a second operator, information to indicate a maximum transmission power reduction of the two uplink carriers, and scheduling information for the two uplink carriers to mitigate the maximum transmission power reduction, wherein the information to indicate the maximum transmission power reduction is to direct the UE to reduce the maximum transmission power of the two uplink carriers only.

11. The method of claim 10, wherein:

the frequency offset comprises a center frequency of an uplink frequency allocation for one or more uplink carriers of the UE.

12. The method of claim 10, wherein the wireless communication network comprises a cellular network configured to operate in accordance with a 3rd Generation Partnership Project (3GPP) protocol.

\* \* \* \* \*